March 17, 1970     C. C. W. VAN ROMONDT VIS     3,500,678
APPARATUS FOR DETERMINING SOIL RESISTANCE INCLUDING A DRILL Filed July 21, 1967     4 Sheets-Sheet 1

INVENTOR:
CONSTANT C. W. VAN ROMOND VIS
BY: A. H. McCarthy
HIS AGENT

INVENTOR:
CONSTANT C. W. VAN ROMOND VIS
BY: J. H. McCarthy
HIS AGENT

United States Patent Office 3,500,678
Patented Mar. 17, 1970

3,500,678
APPARATUS FOR DETERMINING SOIL RESISTANCE INCLUDING A DRILL
Constant C. W. Van Romondt Vis, The Hague, Netherlands, assignor to Shell Oil Company, New York, N.Y., a corporation of Delaware
Filed July 21, 1967, Ser. No. 655,034
Claims priority, application Netherlands, Aug. 17, 1966, 6611541
Int. Cl. G01n 3/36; E21b 47/026
U.S. Cl. 73—84                                   6 Claims

ABSTRACT OF THE DISCLOSURE

A method and apparatus for determining the resistance of the soil in the floor of a body of water. The apparatus (known as a penetrometer) includes an extensible sounding pin which can be driven into the soil and the stress in the pin measured to determine soil resistance. A fluid-turbine driven drill bit is rotatably mounted about the pin to assist the apparatus in penetrating into the soil. In operation, the stress in the pin can be measured continuously as the apparatus is buried or intermittently by retracting the pin, drilling to advance the apparatus into the soil and then extending the pin to measure soil resistance. Alignment of the device is maintained by a guide positioned on the floor of the body of water.

BACKGROUND OF THE INVENTION

In erecting relatively heavy structures, which have to be supported by the soil, it is important to be able to first determine the resistance or bearing capacity of the soil. If, for instance, it is desired to set up a platform provided with legs in a sea or a body of water, such as is used interalia in drilling for oil or gas, it is first necessary to discover whether the bottom of the sea or body of water possesses sufficient resistance or bearing capacity to be able to support the platform legs in such a way that no undesirable sinking of the legs takes place.

It is known to determine the resistance of the soil by making use of a method and an apparatus (known as a penetrometer), whereby a conical-shaped probe secured to a sounding pin is pressed into the soil, and the resistance measured, for example, as by means of electric strain gauges.

SUMMARY

The primary object of the invention is to provide a novel method and novel equipment of the said type, particularly but not exclusively suited for use in the determination of the resistance of beds of seas and other bodies of water.

In accordance with the invention a penetrometer is employed which comprises a weight, a drill, a drive motor for the drill, an extensible and retractable sounding pin, which carries a conical-shaped probe, a drive motor for the sounding pin and a device for measuring the resistance of the soil. The penetrometer is lowered onto the soil by means of a cable, chain or flexible line, and measuring of the soil resistance encountered by the conical-shaped probe is combined with the drilling of a hole in the soil by means of the drill.

DESCRIPTION OF THE PREFERRED EMBODIMENT

Figure 1:
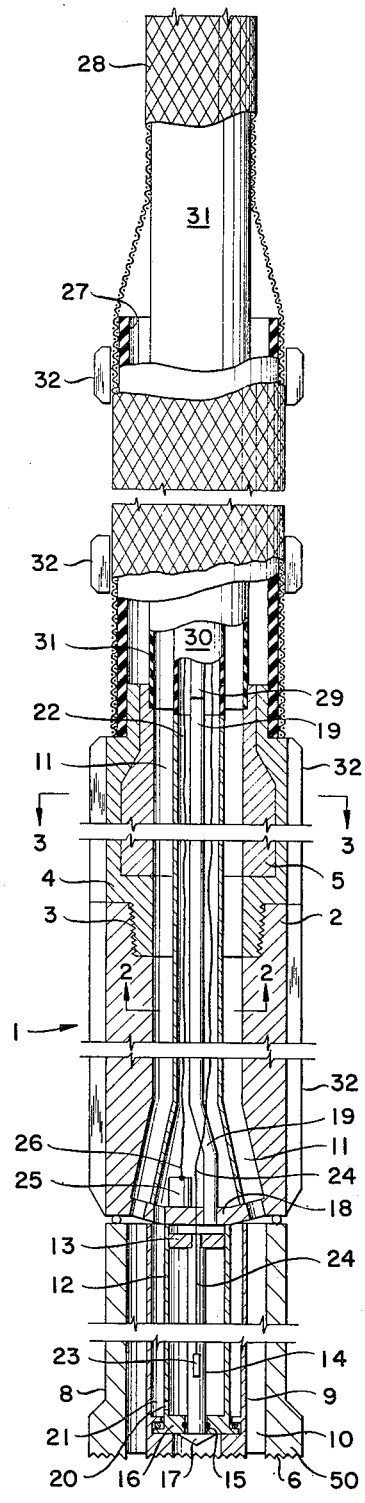
FIGURE 1 is a longitudinal side view in partial cross-section of an embodiment of the penetrometer according to the invention.

The penetrometer comprises a casing 1, composed of a first part 2, which is connected by a screw thread 3 to a second part 4 (see FIGURE 1). The second part 4 is filled with a heavy material, such as, for example, lead, which serves as a weight 5. At the lower end the casing 1 carries a drill 6. The drill 6 can be powered by a drive motor which is, for instance, a liquid turbine as shown in FIGURE 1. The liquid turbine essentially comprises an outer rotor 8, an inner rotor 9 and blades 10. The casing 1 is provided with a liquid channel 11 for the supply of liquid to drive the liquid turbine. An oblong cylinder 12 is arranged inside the liquid turbine drive motor. The longitudinal axis of the cylinder 12 coincides with the longitudinal axis of the liquid turbine. The cylinder 12 is of approximately the same length as the liquid turbine and is positioned substantially within the liquid turbine. A piston or plunger 13 is arranged in an axially movable manner within the cylinder 12. A sounding pin 14 is secured to the plunger 13. The sounding pin extends axially through the cylinder 12 and protrudes through a bottom cover 16 through an opening 15. The sounding pin 14 is passed in a liquid-tight manner through the opening 15, so that the sounding pin 14 can be axially moved through opening 15.

The free end of the sounding pin 14 carries a conical-shaped probe 17. The cylinder 12 is provided with a top cover 18, to which a liquid channel 19 is connected. This liquid channel 19 extends through the casing 1 and is coaxial with the liquid channel 11. A radial opening 20 in the cylinder 12 connects the space situated below the plunger 13 in the cylinder 12 with a space 21. A liquid channel 22 is connected to the space 21. This liquid channel 22 extends through the casing 1 and is co-axial with the liquid channels 11 and 19. The sounding pin 14 is provided with at least one electric strain gauge 23 which is connected to an electric lead 24 passed through the liquid channel 22. On the top cover 18 of the cylinder 12 is an angle sensing device 25 to which is connected an electric lead 26, which is likewise passed through the liquid channel 22.

A piece of rubber hose 27 is fastened to the upper side of the second part 4 of the casing 1. A cylindrical sleeve or hose 28 of woven metal netting fabric is secured to the outer surface of the hose 27. The sleeve or hose 28 protrudes beyond the free end of the piece of rubber hose 27 and has a length which is at least as great as the depth of the water in which the operation is being carried out.

To the liquid channels 19, 22 and 11 are connected coaxial hoses 29, 30 and 31, which run at least in part through the sleeve or hose 28. The penetrometer is provided on the outside with radial guide lugs 32, the purpose of which will be discussed hereinafter.

Figure 4:
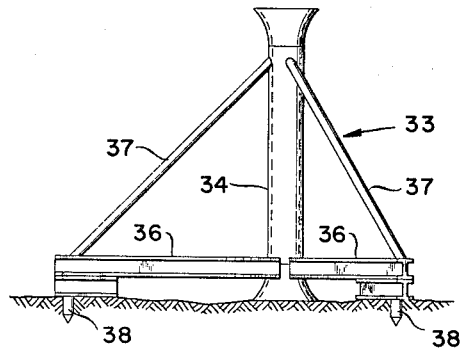
FIGURE 4 is an elevational view of a guiding apparatus for guiding the penetrometer.
Figure 2:
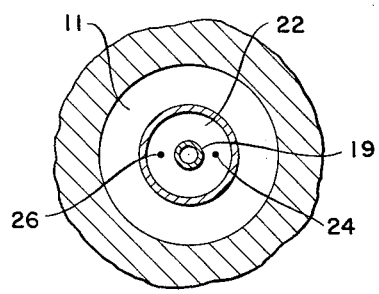
FIGURE 2 is a cross-section of the penetrometer taken along the line 2—2 of FIGURE 1.
Figure 3:
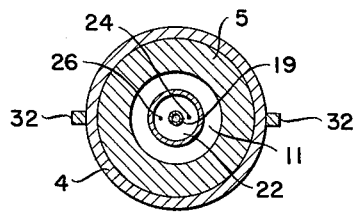
FIGURE 3 is a cross-section of the penetrometer taken along the line 3—3 of FIGURE 1.
Figure 5:
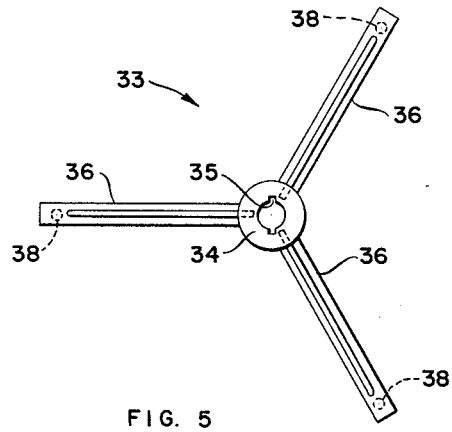
FIGURE 5 is a top plan view of the guiding apparatus according to FIGURE 4.

A guiding apparatus 33 (see FIGURES 4 and 5) comprises a hollow cylindrical part 34, the inside wall of which is provided with axial slots 35 for receiving the guide lugs 32. The lower end of part 34 is provided with radial arms 36 firmly secured to the outside of the part 34. The free extremities of the arms 36 are connected to part 34 by means of rods 37 to provide rigidity. A pointed peg 38 is axially arranged close to the free extremity of each arm 36.

The method according to the invention will now be described with particular reference to FIGURES 6–10.

A ship or vessel 41 is floating in the water 39, the surface of which is designated by the reference numeral 40. The procedure for determining the resistance of the bottom 42 of the water 39 at a point situated beneath the ship 41 is as follows:

The penetrometer, which is designated by the reference numeral 43, is suspended from a cable 44 leading from winch 45. The cable 44 runs over a sheave 46 which is rotatably secured in a jib 47. In this way the penetrometer 43 is suspended outboard in the manner shown in FIGURE 6. As stated earlier, the hose or sleeve 28 made from woven metal netting fabric, within which are arranged the co-axial hoses 29, 30 and 31 together with the electric leads 24 and 26, is fastened to the top of the penetrometer 43. The hose 28 runs over a sheave 48 rotatably suspended in the jib 47 to a drum 49 of the winch 45.

Figure 6:
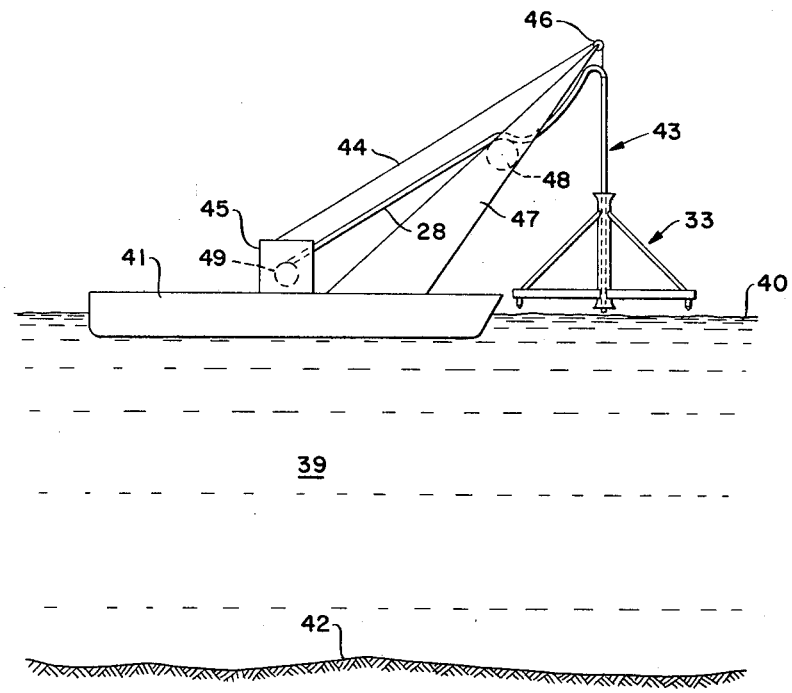
FIGURE 6 is an elevational view showing the penetrometer being lowered from a floating vessel at the moment that the penetrometer is just above the surface of the water.
Figure 7:
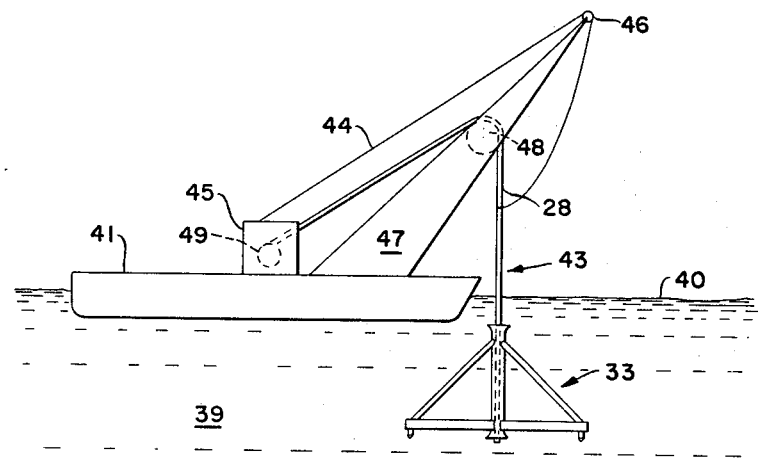
FIGURE 7 is the same elevational view as FIGURE 6 but showing the penetrometer being lowered from a floating vessel at the moment that the penetrometer is situated between the surface of the water and the bottom of the water.
Figure 8:
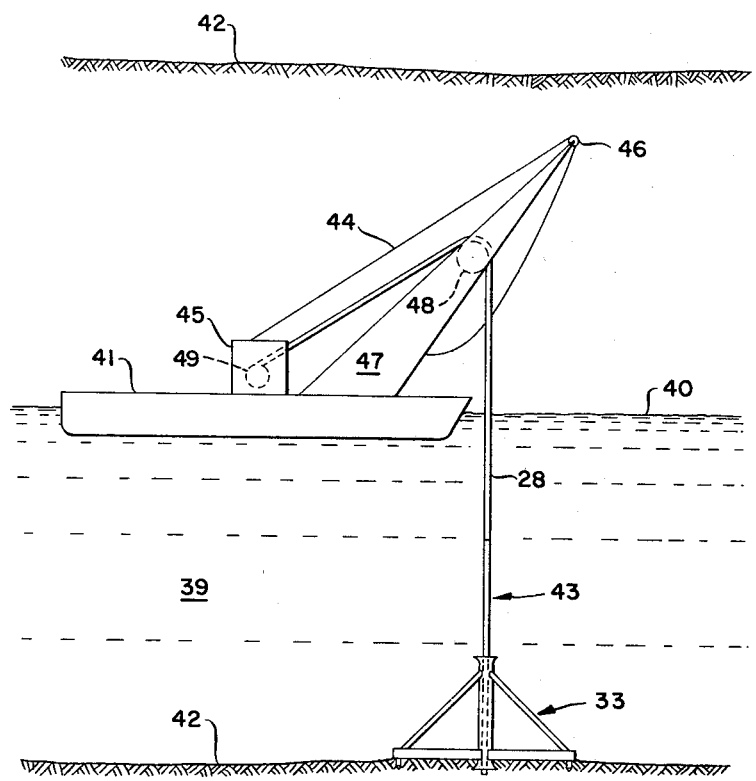
FIGURE 8 is the same elevational view showing the penetrometer being lowered from a floating vessel at the moment that the penetrometer has arrived on the floor of the body of water.

At least part of the hose or sleeve 28 is wound on the drum 49, as shown in FIGURES 6 and 7. The guiding apparatus 33 is fitted onto the penetrometer 43, the radial guide lugs 32 engaging with the axial slots 35. A collar 50 on the drill 6 ensures that the guiding apparatus 33 remains suspended on the penetrometer in the manner shown. After the penetrometer 43 has been suspended above the surface of the water 40 as shown in FIGURE 8 the cable 44 is paid out so that the weight of the penetrometer 43 is transmitted from the cable 44 to the hose 28. The position with the hose 28 carrying the entire weight of the penetrometer 43 is shown in FIGURE 7. The cable 44 may subsequently be detached from the penetrometer 43. In this position the penetrometer 43 is already partly in the water 39. The hose 28 is subsequently paid out by rotating the drum 49 with the result that the penetrometer 43 is lowered further into the water 39 until the meter 43 has reached the bottom 42 (see FIGURE 8). Owing to the fact that the hose or sleeve 28 contains woven metal netting fabric this hose or sleeve is able to bear the weight of the penetrometer 43 during the lowering operation. Alternatively, cable 44 may be used to lower the penetrometer if desired so that hose 28 does not have to bear the weight of the penetrometer during lowering. The guiding apparatus 33 ensures that the longitudinal axis of the penetrometer 43 takes up a position normal or substantially normal to the bottom 42.

Figure 9:
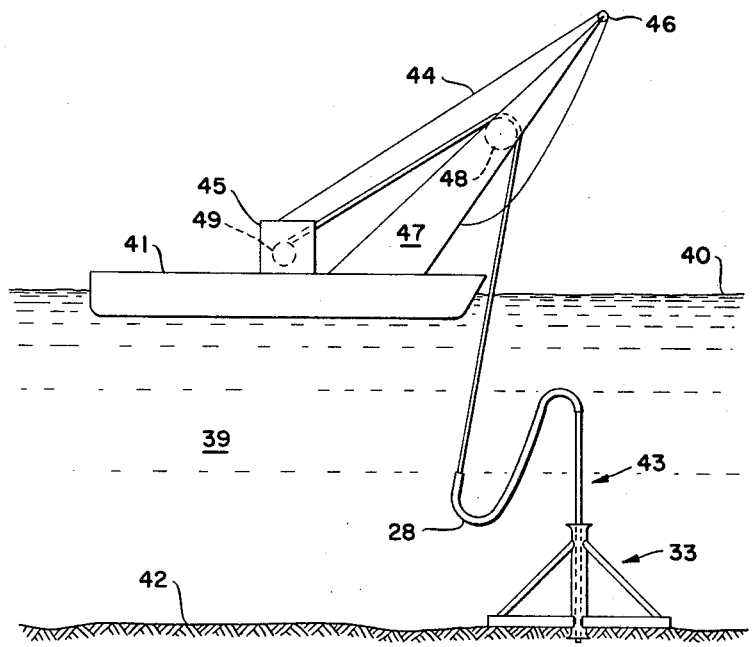
FIGURE 9 is the same view as FIGURE 8 but with the flexible lines or cables that carry the penetrometer paid out so that the penetrometer is resting completely on the floor of the body of water.
Figure 10:
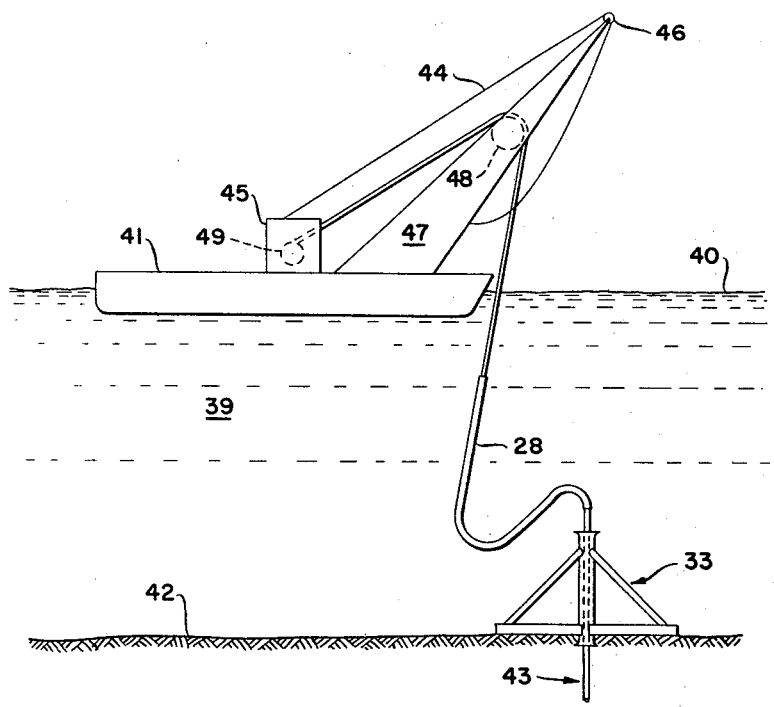
FIGURE 10 is the same view as FIGURE 9 showing the soil resistance being determined by the penetrometer at a given depth in the floor of the body of water.

It is possible to extend the sounding pin 14 beforehand by passing liquid under pressure from the vessel 41 through the liquid channel 19 to the space situated above the piston 13 in the cylinder 12. If the hose 28 is further paid out as shown in FIGURE 9, the entire weight of the penetrometer 43 will be borne by the bottom 42. Due to the weight of the penetrometer 43, which contains a weighting element 5 as described above, the penetrometer 43 will sink into the soil 42. As the penetrometer 43 sinks into the soil 42, the sounding pin 14 is in the extended position, i.e., the conical-shaped probe 17 is some distance ahead of the penetrometer 43 during the sinking. The penetrometer 43 continues to sink into the soil until a state of equilibrium is reached. The stress in the sounding pin 14 is a measure of the resistance encountered in the soil 42. During the sinking this stress can be continuously measured by means of the strain gauges 23 and the electric leads 24 leading to the vessel 41. As soon as a state of equilibrium has been reached and the penetrometer 43 will not sink any further, the sounding pin 14 with the conical-shaped probe 17 are withdrawn into the penetrometer 43. This is effected by introducing liquid under pressure from the vessel 41 through the liquid line 22, the space 21 and the radial opening 20 to the space beneath the piston or plunger 13, so that the plunger 13 as well as the sounding pin 14 and the conical-shaped probe 17 are displaced in an upward direction. In the final position the conical-shaped probe 17 no longer extends beyond the penetrometer 43. Since the withdrawal of the probe 17 means that the penetrometer 43 will encounter less resistance in the soil 42 the penetrometer will now sink a little further into the soil 42 until a new state of equilibrium is reached.

The liquid turbine 7, which powers the drill 6, can now be started. This is effected by passing liquid under pressure from the ship 41 to the blades 10 through the hose 31 and the liquid channel 11. The rotation of the drill 6 will cause the penetrometer to work deeper into the soil 42. The guide lugs 32 on the penetrometer 43 and on the hose or sleeve 28, which engage with the axial slots 35 in the guiding apparatus 33, absorb the torsional moment generated by the turbine 7.

After the drilling has continued for some time, the drill 6 is stopped. The sounding pin 14 with the appurtenant conical-shaped probe 17 can then be pushed outwards by passing liquid under pressure above the plunger 13. During the extension of the sounding pin 14 the pressure in the pin 14 can be measured by means of the strain gauges 23. The values measured are a measure of the resistance encountered in the soil 42 by the conical-shaped probe 17. The procedure can then be repeated by retracting the sounding pin 14 with the conical-shaped probe 17 and continuing the drilling. The drilling is again stopped and the sounding pin 14 and the conical-shaped probe 17 are extended and the strain encountered is measured by the strain gauges 23 as described above.

Instead of the above method, in which drilling is alternated with measuring, it is also possible to maintain the sounding pin 14 and the conical-shaped probe 17 in the extended position during drilling. For this purpose, however, the sounding pin 14 must have a length such that in the extended position the conical-shaped probe 17 is always situated in those layers of soil which have not yet been penetrated by the drill 6.

In this latter method it is possible to measure continuously the stress prevailing in the sounding pin 14 during drilling by means of the strain gauge 23. The values measured are a measure of the soil resistance.

By means of the angle sensing device 25 it is always possible to check whether the penetrometer 43 is moving in the correct direction in the soil 42.

A counting mechanism (not shown) can be connected to the sounding pin 14, so that it can be determined how far out the probe 17 has been extended. The guiding apparatus 33 can also be provided with a counting mechanism (not shown) to determine how far the penetrometer 43 has moved into the soil 42. If desired, the winch 45 can be provided with a swell compensator of a type known in the art. The length of the rubber hose 27 is at least equal to the maximum soil depth to be investigated minus the length of the penetrometer 43. The purpose of the hose 27 is to keep open the hole in the soil 42, so that the penetrometer 43 can easily be withdrawn on completion of the operations. The drilling speed can be regulated by varying the quantity of liquid fuel supplied to the turbine 7.

I claim as my invention:

1. An apparatus for measuring the soil resistance of the floor of a body of water, said apparatus comprising:
   a hollow elongated housing;
   flexible conduit means attached to one end of said housing and adapted to communicate with the interior of said housing;
   a hollow drill bit rotatably mounted on the other end of said housing;
   a hollow drill bit rotatably mounted on the other end of said housing;
   a cylinder carried by said other end of said housing and positioned in the interior of said drill bit;
   pin means reciprocably mounted in said cylinder for axial extension therefrom and having a soil contacting probe on one end thereof;
   sensing means attached to said pins means for measuring stress developed in said pin;
   drive means carried within said housing for rotatably driving said drill bit; and
   first fluid conduit means carried by said housing and communicating with the interior of said cylinder and adapted to supply fluid to said cylinder from a source of pressurized fluid to extend said pin means and cause said probe to penetrate said soil.

2. An apparatus according to claim 1 wherein said sensing means comprises at least one strain gauge attached to said pin.

3. An apparatus according to claim 2 wherein said drive means for said drill bit comprises:
   a fluid turbine carried by said drill bit; and
   second fluid conduit means carried by said housing and adapted to supply fluid to said tubing from a source of pressurized fluid.

4. An apparatus as defined in claim 3 including angle-sensing means carried by said housing and attached thereto for determining the angular position of said apparatus.

5. An apparatus as defined in claim 4 including in combination:
   guide means supportable by the floor of said body of water, said guide means having a vertical bore formed therein for carrying and guiding said apparatus.

6. An apparatus as defined in claim 5 including weighting means carried by said housing.

References Cited

UNITED STATES PATENTS

| | | | |
|---|---|---|---|
| 2,833,144 | 5/1958 | Miller et al. | 73—84 |
| 3,148,538 | 9/1964 | Heerema | 73—84 |
| 3,149,490 | 9/1964 | Clemente et al. | 73—151 |
| 3,422,672 | 1/1969 | Payne | 175—50 |

JAMES J. GILL, Primary Examiner

E. J. KOCH, Assistant Examiner

U.S. Cl. X.R.

73—151